US009126507B2

(12) United States Patent
Radermacher et al.

(10) Patent No.: US 9,126,507 B2
(45) Date of Patent: Sep. 8, 2015

(54) LONGITUDINAL SEAT ADJUSTER FOR A VEHICLE SEAT HAVING EASY ENTRY FUNCTIONALITY AND FOLDING FUNCTIONALITY

(71) Applicant: Johnson Controls GmbH, Burscheid (DE)

(72) Inventors: Markus Radermacher, Cologne (DE); Jeevan Sooda, Burscheid (DE); Harshal Deshmukh, Burscheid (DE); Stuart Woolston, Glasgow (GB)

(73) Assignee: Johnson Controls Technology Company, Holland, MI (US)

( * ) Notice: Subject to any disclaimer, the term of this patent is extended or adjusted under 35 U.S.C. 154(b) by 197 days.

(21) Appl. No.: 13/797,761

(22) Filed: Mar. 12, 2013

(65) Prior Publication Data
US 2013/0292982 A1    Nov. 7, 2013

Related U.S. Application Data

(60) Provisional application No. 61/611,077, filed on Mar. 15, 2012.

(51) Int. Cl.
| B60N 2/08 | (2006.01) |
| B60N 2/12 | (2006.01) |
| B60N 2/14 | (2006.01) |
| B60N 2/20 | (2006.01) |

(52) U.S. Cl.
CPC .. B60N 2/12 (2013.01); B60N 2/08 (2013.01); B60N 2/14 (2013.01); B60N 2/146 (2013.01); B60N 2/20 (2013.01)

(58) Field of Classification Search
CPC ....................................................... B60N 2/146
USPC .................... 248/430; 297/341; 296/65.13
See application file for complete search history.

(56) References Cited

U.S. PATENT DOCUMENTS

| 5,022,707 | A | * | 6/1991 | Beauvais et al. ........... 297/216.2 |
| 5,882,061 | A | * | 3/1999 | Guillouet ................... 296/65.05 |
| 5,918,846 | A | * | 7/1999 | Garrido ......................... 248/429 |
| 6,152,533 | A | * | 11/2000 | Smuk ............................ 297/341 |
| 6,494,536 | B2 | * | 12/2002 | Plant ......................... 297/284.11 |
| 6,843,460 | B2 | * | 1/2005 | Koga et al. ................... 248/421 |
| 7,533,936 | B2 | * | 5/2009 | Ujimoto et al. .......... 297/344.13 |
| 7,562,926 | B2 | * | 7/2009 | Kojima ...................... 296/65.13 |
| 7,850,241 | B1 | * | 12/2010 | Lucci et al. ................... 297/331 |
| 7,914,061 | B2 | * | 3/2011 | Jeong ......................... 296/65.05 |
| 8,141,954 | B2 | * | 3/2012 | Kumazaki et al. ............ 297/341 |
| 8,157,315 | B2 | * | 4/2012 | Lindsay .................... 296/65.05 |
| 8,496,294 | B2 | * | 7/2013 | Holdampf et al. ............ 297/316 |
| 2010/0270823 | A1 | * | 10/2010 | Iwasa et al. ..................... 296/66 |

FOREIGN PATENT DOCUMENTS

| DE | 102010040424 A1 | * | 5/2011 |
| EP | 2386441 A2 | * | 11/2011 |

* cited by examiner

*Primary Examiner* — Joshua J Michener
*Assistant Examiner* — Chiedu Chibogu
(74) *Attorney, Agent, or Firm* — Fletcher Yoder, P.C.

(57) ABSTRACT

The invention relates to a longitudinal seat adjuster for a vehicle seat having easy entry functionality and folding functionality, comprising a rail system for longitudinal seat adjustment having a lower rail and an upper rail and an unlocking device.

7 Claims, 3 Drawing Sheets

LONGITUDINAL SEAT ADJUSTER FOR A VEHICLE SEAT HAVING EASY ENTRY FUNCTIONALITY AND FOLDING FUNCTIONALITY

CROSS REFERENCE TO RELATED APPLICATIONS

This application is a Non-provisional application of U.S. Provisional Application Ser. No. 61/611,077, entitled "Longitudinal Seat Adjuster for a Vehicle Seat Having Easy Entry Functionality and Folding Functionality", filed Mar. 15, 2012, which is hereby incorporated by reference.

BACKGROUND

The invention relates to a longitudinal seat adjuster for a vehicle seat having easy entry functionality and folding functionality, comprising a rail system for longitudinal seat adjustment having a lower rail and an upper rail and an unlocking device.

In the prior art, there is arranged on vehicle seats having easy entry function a securing device, for example, a stop or a lock, which prevents the vehicle seat from moving into the normal position of the vehicle seat owing to the easy entry function. This securing device is usually releasably formed in order to produce the easy entry function. The securing device is often constructed as a mechanism having a locking pawl. In order to release the securing device, an unlocking device is provided.

SUMMARY

An object of the invention is to provide a longitudinal seat adjuster which is improved with respect to the prior art and which has, for a vehicle seat having easy entry functionality, an unlocking device which in particular can be loaded to a greater extent, has further reduced weight and can be more easily operated.

The object is achieved according to the invention by the features of claim 1. Advantageous embodiments of the invention are set out in the dependent claims.

The longitudinal seat adjuster according to the invention for a vehicle seat having easy entry functionality and folding functionality comprises a rail system for longitudinal seat adjustment having a lower rail and an upper rail and an unlocking device for unlocking the longitudinal seat adjustment and a securing device for fixing the vehicle seat to the rail system. In this instance, the unlocking device has a roller element and at least two unlocking levers which are arranged at the two sides of the vehicle seat and which each have a protruding guiding lever, the securing device being able to be released and the roller element rolling on the guiding lever in the manner of a cam mechanism for the easy entry functionality.

Using the longitudinal seat adjuster according to the invention having an unlocking device with integrated cam mechanism, it is possible to unlock the rail system independently of a position of the backrest. This unlocking is advantageously integrated on or in the rail system. In a particularly advantageous manner, such unlocking can be produced using few components.

An embodiment of the invention makes provision for the roller element to roll on the guiding lever during the entire pivot movement of the vehicle seat about a rotation axis. This enables a particularly low level of malfunction and reliable easy entry functionality.

In a possible development of the invention, the guiding lever has such an outer contour that the unlocking lever can be moved at least into an unlocking position by means of the roller element which engages on the guiding lever, whereby the locking of the rails can be released.

Furthermore, the outer contour of the guiding lever is constructed in such a manner that, when the unlocking lever is released, using the roller element which further engages on the guiding lever, by the vehicle seat being pivoted about the rotation axis in the travel direction, the vehicle seat can be pivoted forwards to the maximum extent and can optionally be longitudinally displaced. Furthermore, the guiding lever has an outer contour having a rounded guiding end, the roller element which engages on the guiding lever being able to be extended in an unimpeded manner beyond the guiding end so that a limiting and/or damping element can be pretensioned accordingly. This enables reliable easy entry functionality with minimized wear.

In a possible embodiment, the outer contour of the guiding lever is constructed in a curved manner. For example, the outer contour is constructed in the manner of a chicane or a double curve. A guiding lever which is profiled in this manner can be produced as a simple molded component in a cost-effective manner and on an industrial scale and enables reliable guiding. Furthermore, a movement of the roller element along the guiding portions of the guiding lever is enabled with minimal friction.

In another embodiment, there are arranged at both sides of the vehicle seat securing devices to which at one end a backrest of the vehicle seat is secured so as to be able to be pivoted relative to the seat face about a pivot axis, and which at this end each have at least one locking element, the locking elements fixing the vehicle seat to the rail system in the locked position and the backrest being able to be pivoted about the pivot axis. A simple folding functionality of the vehicle seat is thereby enabled.

Advantageously, the respective opposing ends of the securing devices are constructed as rotation axes, about which the vehicle seat can be pivoted with the securing devices arranged at both sides when the locking elements are released. This enables the easy entry functionality in a simple manner. Furthermore, with a combination of securing devices and unlocking devices, both the folding functionality and the easy entry functionality can be produced.

In a particularly simple embodiment, the locking elements are each constructed as hook-like formations which in the locked position releasably engage in correspondingly constructed receiving elements. For example, the locking elements are constructed as locking pawls which releasably engage in locking rods.

In another particularly simple embodiment, the respective securing device is provided with a retention pin which protrudes therefrom and on which the associated roller element is rotatably arranged.

In order to synchronize the unlocking devices which are arranged at both sides of the vehicle seat, the associated unlocking levers are each connected in a rotationally secure manner to a transmission element and are coupled to each other thereby.

During operation of the longitudinal seat adjuster, during the operation of the easy entry functionality, the vehicle seat is released from the rail system at least at one side using the securing devices and the rail system is unlocked by means of the unlocking devices.

During the operation of the easy entry functionality and in particular during a resultant pivoting movement of the vehicle seat in a forward direction and another movement of the vehicle seat in the longitudinal direction into a position which facilitates the entry of vehicle occupants, the guiding lever, in particular the curved outer contour thereof with the roller element, at least partially forms a positive-locking and/or non-positive-locking engagement in such a manner that the unlocking lever of the easy entry functionality moves downwards into an unlocked position and is retained and the vehicle seat, counter to a limiting element, in particular a spring, for example, a return spring, can be pivoted forwards to the maximum extent and can optionally be adjusted longitudinally.

DRAWINGS

Embodiments of the invention are explained in greater detail below with reference to the drawings, in which:

FIG. 1 is perspective view of a longitudinal seat adjuster for a rail system of a vehicle seat, FIG. 2 is a side view of a side of the longitudinal seat adjuster with the unlocking device and securing device in the locked position, FIG. 3 is a side view of a side of the longitudinal seat adjuster with the unlocking device in the unlocked position and securing device in the unlocked position moved forwards, FIG. 4 is an enlarged side view of a side of the longitudinal seat adjuster in the region of the unlocking device in the locked position, FIG. 5 is an enlarged side view of a side of the longitudinal seat adjuster in the region of the unlocking device in the unlocked position and with a securing device in the unlocked position moved forwards.

DETAILED DESCRIPTION

Components which correspond to each other are given the same reference numerals in all the figures.

FIG. 1 is a perspective view of a side of a longitudinal seat adjuster 1 for a vehicle seat which is not illustrated in greater detail and which has easy entry functionality and folding functionality.

The vehicle seat usually comprises at least one seat face and a backrest. In FIG. 1, the vehicle seat is shown in the normal position, in which the backrest is placed in a substantially upright position. In this position, conventional use of the vehicle seat is enabled.

The vehicle seat is in particular a vehicle seat in a second row or front row of a vehicle. Vehicle seats which are arranged at that location generally have an easy entry functionality and/or a folding functionality for easier entry and exit of vehicle occupants or for easier access to the inner region of the vehicle located therebehind.

In order to achieve an easy entry functionality and/or a folding functionality of the vehicle seat, the longitudinal seat adjuster 1 comprises a securing device 3 for fixing the vehicle seat to the rail system 2 in order to prevent pivoting of the vehicle seat about a rotation axis D, and an unlocking device 4 for unlocking the rail system 2 in order to enable a longitudinal displacement of the vehicle seat.

The seat face which is not illustrated and the backrest which is not illustrated are coupled to each other so as to be able to be pivoted about a pivot axis S.

In order to fix the vehicle seat to the rail system 2 in order to longitudinally adjust the seat, the longitudinal seat adjuster 1 comprises the securing device 3 to which the vehicle seat is secured.

Using the rail system 2 which comprises at least an upper rail 2.1 and a lower rail 2.2, the vehicle seat can be longitudinally displaced in conventional manner.

The securing device 3 is secured to the rail system 2. For example, the securing device 3 is releasably secured to the upper rail 2.1 of the rail system 2.

The securing device 3 is constructed at both sides of the vehicle seat and comprises at each side a side sheet 3.1 (also referred to as a fixing sheet or frame). The respective side sheet 3.1 comprises at least one locking element 3.2. The locking element 3.2 may be constructed separately and secured, in particular screwed or welded, to the side sheet 3.1. Alternatively, the locking element 3.2 and the side sheet 3.1 may be constructed as a shaped component.

The locking element 3.2 is constructed in a hook-like manner, for example, as a locking pawl, and engages in the locked position in a correspondingly constructed receiving element 2.1.1 of the upper rail 2.1. With a hook-like construction of the locking element 3.2, the receiving element 2.1.1 is constructed as a rod. Alternatively, there may be provided in the rail system 2 a corresponding catch opening in which the locking element 3.2 releasably engages. The locking element 3.2 is releasably retained on the receiving element 2.1.1 so that, when the locking element 3.2 is released from the receiving element 2.1.1 of the track system 2, the vehicle seat can be pivoted about the rotation axis D.

To this end, the backrest of the vehicle seat is secured at one end of the securing device so as to be able to be pivoted about the pivot axis S. The locking element 3.2 is further arranged at this end.

In order to achieve the folding functionality of the vehicle seat, the securing device 3 is in the secured state, that is to say, the vehicle seat is fixed to the rail system 2 by means of the locking elements 3.2 at both sides. The backrest of the vehicle seat in this state can be pivoted about the pivot axis S relative to the seat face so that the backrest can be folded onto the seat face of the vehicle seat.

In order to achieve the easy entry functionality, the longitudinal seat adjuster 1 comprises the unlocking device 4. The unlocking device 4 has at least two unlocking levers 4.2 which are arranged at both sides on the vehicle seat and which each have a protruding guiding lever 4.2.1 and which each have at least one associated roller element 4.1. For the easy entry functionality, the securing device 3 is released, whereby the vehicle seat can be pivoted about the rotation axis D and the respective roller element 4.1 rolls on the guiding lever 4.2.1 in the manner of a cam mechanism.

In this instance, the rotation axis D is formed at the end of the securing device 3 which is opposite the locking element 3.2. When the locking elements 3.2 are unlocked, the vehicle seat with the securing devices 3 which are arranged at both sides can thereby be pivoted about the rotation axis D in order to achieve the easy entry functionality.

In order to actuate the unlocking lever 4.2 by engaging the roller element 4.1 during the pivot movement of the vehicle seat, the respective securing device 3 has a protruding retention pin 3.3 on which the roller element 4.1 is rotatably arranged. The roller element 4.1 rolls during the entire pivot movement of the vehicle seat about the rotation axis D on the associated guiding lever 4.2.1.

In order to synchronize the movements of the securing devices 3 which are arranged at both sides on the vehicle seat, there is provided a transmission element 3.4 which connects the two securing devices 3 to each other in a rotationally secure manner.

In order to synchronize the movements of the unlocking device 4 which is arranged at both sides on the vehicle seat, there is provided another transmission element 4.3 which connects the two unlocking devices 4 to each other in a rotationally secure manner.

Depending on the embodiment, the two transmission elements 3.4 and 4.3 are constructed as coupling or synchronization rods and are secured to the securing devices 3 or the unlocking devices 4 in a positive-locking, materially engaging or non-positive-locking manner, in particular welded. The transmission element 4.3 of the unlocking devices 4 can additionally be constructed as an actuation element or be provided with one in order to actuate the unlocking action.

In order to achieve this position of the vehicle seat for an easy entry functionality for vehicle occupants, the guiding lever 4.2.1 has a curved outer contour. In this instance, the unlocking lever 4.2 can be moved by means of the roller element 4.1, which engages at the outer side of the guiding lever 4.2.1 by the vehicle seat being pivoted along a first arrow P1, at least into an unlocking position along a second arrow P2. In particular the guiding lever 4.2.1 is pressed forwards by the engaging roller element 4.1 owing to the pivot movement of the vehicle seat, and the unlocking lever 4.2 is pressed downwards according to the second arrow P2. The locking of the rails 2.1, 2.2 can thereby be released so that they can be longitudinally displaced relative to each other.

The outer contour of the guiding lever 4.2.1 is further constructed in such a manner that, following successful unlocking of the rail system 2 by pressing down the unlocking lever 4.2 and further pivoting the vehicle seat about the rotation axis D in the travel direction by means of the roller element 4.1 which further engages on the guiding lever 4.2.1, the vehicle seat can be pivoted forwards to the maximum extent and is optionally longitudinally displaceable. The roller element 4.1 can be extended beyond a rounded guiding end of the guiding lever 4.2.1 in an unimpeded manner.

Figure 3:
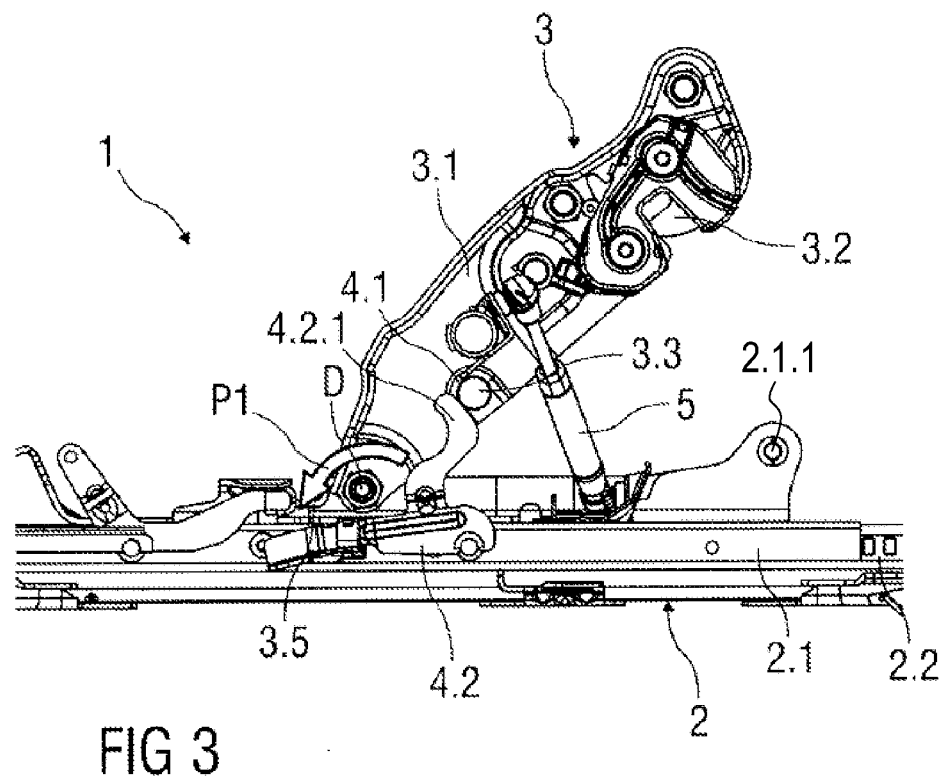
FIG. 3 is a side view of the longitudinal seat adjuster 1 in the released and unlocked position, that is to say, the vehicle seat is released from the rail system 2 and is pivoted about the rotation axis D into a position tilted forwards, the longitudinal adjustment having been unlocked.

In this instance, the pivot movement of the vehicle seat is limited in a forward travel direction and damped back into the locked position by means of a limiting element 5 which is shown in FIG. 3. To this end, the limiting element 5 is constructed, for example, as a damper or a compression spring, in particular a pneumatic compression spring. In order to limit the pivot movement of the vehicle seat in the forward travel direction to the maximum extent, the securing device 3 has, at the end with the rotation axis D, an angled stop 3.5 which, in the event of a maximum pivot action of the vehicle seat, strikes the rail system 2, in particular the upper rail 2.1, as illustrated in FIG. 3. This combined guided pivoting and longitudinal movement of the vehicle seat enables facilitated entry and exit for the rear occupants of the vehicle.

Figure 1:
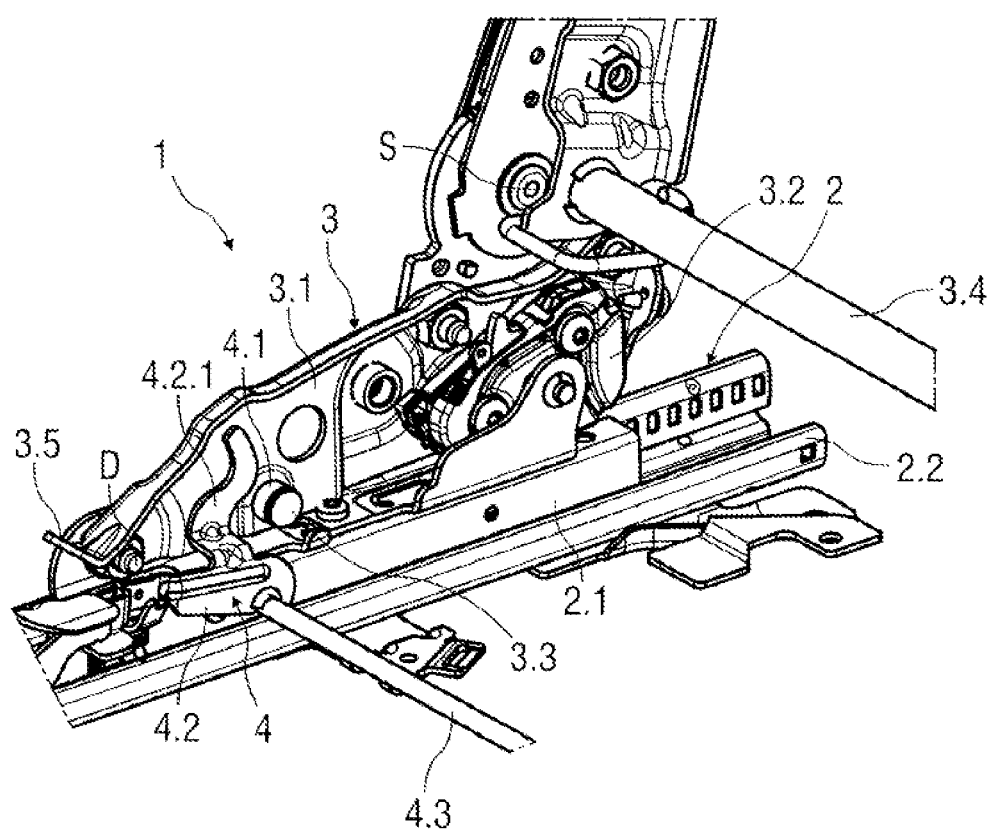
Figure 2:
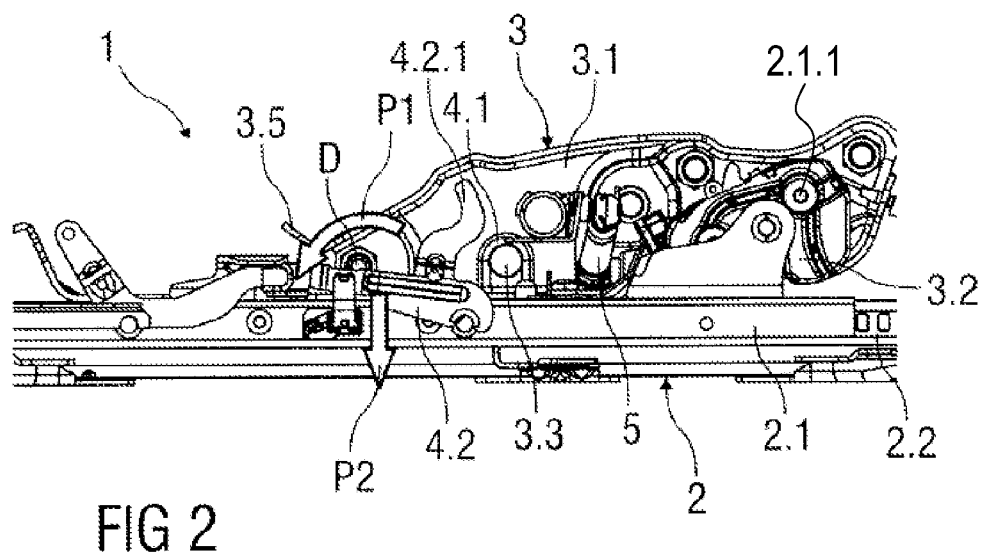
FIG. 2 is a side view of the longitudinal seat adjuster 1 according to FIG. 1 in a secured position, that is to say, the vehicle seat is fixed to the rail system 2 and the longitudinal adjustment is locked so that only the backrest can be folded about the pivot axis S shown in FIG. 1, if desired.
Figure 4:
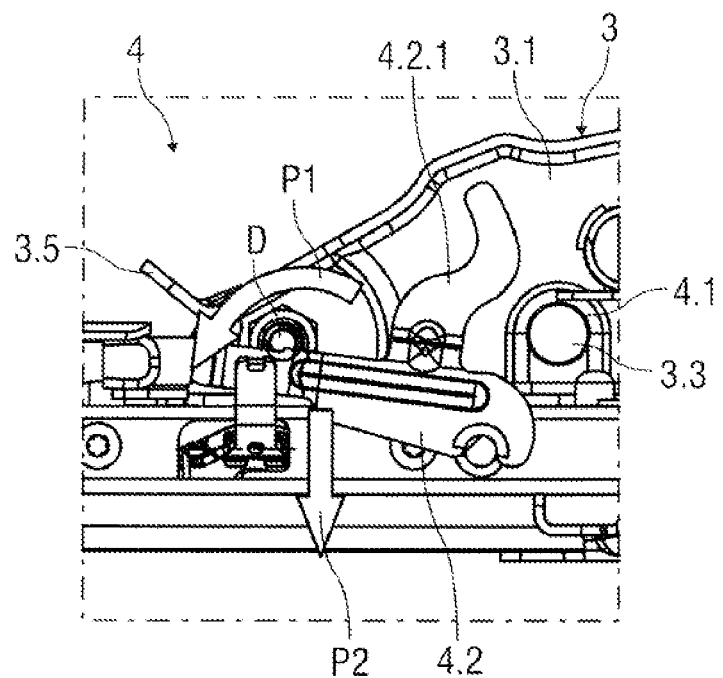
Figure 5:
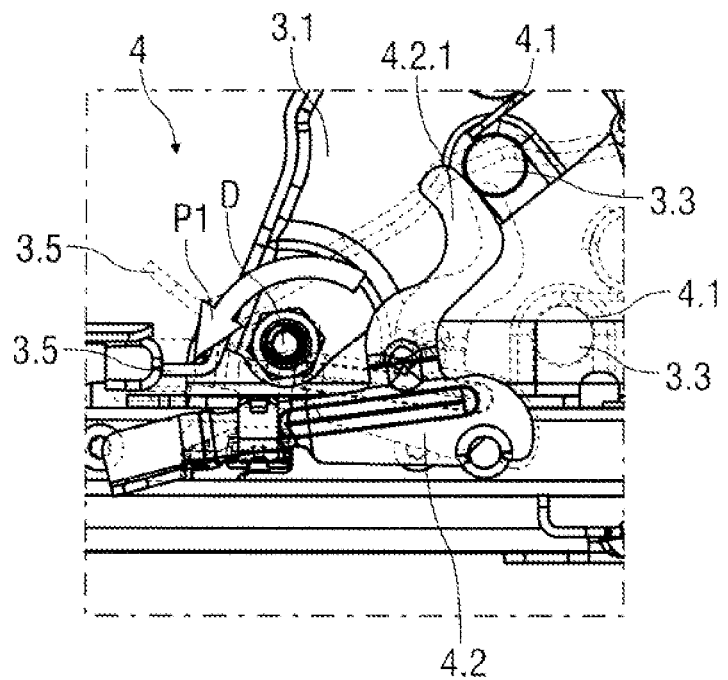

FIGS. 4 and 5 are enlarged cutouts of the unlocking device 4 according to FIGS. 2 and 3, the locked position of the unlocking device 4 shown in FIGS. 2 and 4 being illustrated with broken lines in FIG. 5.

In particular, the curved shape of the outer contour of the guiding lever 4.2.1 is shown in detail. The outer contour comprises at least a first curve and a second curve which together form a chicane-like outer contour or double curve. Owing to the guiding of the movement of the roller element 4.1 which engages on the outer contour along the first curved portion, the unlocking lever 4.2 is pressed downwards according to the second arrow P2. The further guiding of the engaging roller element 4.1 along the second curved portion is carried out as far as the maximum pivot movement of the vehicle seat, which is limited by the limiting element 5.

The longitudinal seat adjuster 1 according to the invention with a combination of securing devices 3 and unlocking devices 4 with simple unlocking levers 4.2 and roller elements 4.1 which actuate them and which roll in the manner of a cam mechanism on the associated guiding lever 4.2.1, enables simple and malfunction-free and cost-effective easy entry functionality.

The invention claimed is:

1. A longitudinal seat adjuster for a vehicle seat having entry functionality and folding functionality, comprising a rail system for longitudinal seat adjustment comprising a lower rail and an upper rail, an unlocking device for unlocking the longitudinal seat adjustment, and a securing device for fixing the vehicle seat to the rail system, wherein the unlocking device comprises a roller element and at least one unlocking lever arranged at one side of the vehicle seat which has a protruding guiding lever, wherein the securing device is able to be released, the roller element is configured to roll along a surface of the protruding guiding lever in response to rotation of the vehicle seat about a rotation axis, and the protruding guiding lever is configured to progressively drive the unlocking lever toward an unlocking position that unlocks the longitudinal seat adjustment as the roller element rolls along the surface of the protruding guiding lever.

2. The longitudinal seat adjuster according to claim 1, wherein the surface of the protruding guiding lever is curved.

3. The longitudinal seat adjuster according to claim 1, wherein a backrest of the vehicle seat is rotatably secured to the securing device so as to be able to be pivoted relative to the securing device about a pivot axis, and wherein the securing device comprises at least one locking element fixing the vehicle seat to the rail system in a locked position wherein the backrest is able to be pivoted about the pivot axis.

4. The longitudinal seat adjuster according to claim 3, wherein the rotation axis extends through an end of the securing device, and the vehicle seat is rotatable with the securing device when the at least one locking element is released.

5. The longitudinal seat adjuster according to claim 3, wherein the at least one locking element forms a hook which releasably engages a receiving element of the upper rail while in the locked position.

6. The longitudinal seat adjuster according to claim 1, wherein the securing device is provided with a retention pin which protrudes therefrom and on which the associated roller element is rotatably arranged.

7. The longitudinal seat adjuster according to claim 1, wherein the unlocking lever is non-rotatably coupled to a transmission element.

* * * * *